3,291,794
N-(1,2,4-BENZOTHIADIAZINE-7-SULFONYL)-
SULFILIMINES
Charles Ferdinand Huebner, Chatham, N.J., assignor to
Ciba Corporation, New York, N.Y., a corporation of
Delaware
No Drawing. Filed Oct. 6, 1965, Ser. No. 493,550
6 Claims. (Cl. 260—243)

The present invention concerns and has for its object the provision of N-(1,2,4-benzothiadiazine-7-sulfonyl)-sulfilimines and methods for their preparation.

More particularly it relates to compounds having the Formula I

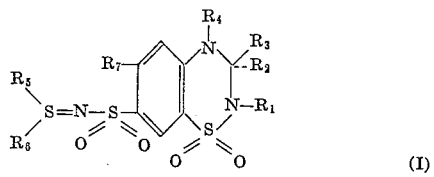

in which each of $R_1$ to $R_4$ stands for hydrogen or an aliphatic or araliphatic hydrocarbon radical, $R_1$ also for the acyl radical of a carboxylic acid, $R_2$ and $R_3$ together also for lower alkylene and $R_3$ and $R_4$ together also for a direct bond, each of $R_5$ and $R_6$ for an aliphatic or araliphatic hydrocarbon radical and $R_7$ for halogen or trifluoromethyl.

An aliphatic hydrocarbon radical representing the groups $R_1$ to $R_6$, above all stands for lower alkyl, such as methyl, ethyl, n- or i-propyl, n-, i-, sek. or tert. butyl, n- or i-pentyl, neopentyl, n-hexyl or n-heptyl, but also for lower alkenyl, such as vinyl, allyl, methallyl, 2-butenyl or 3-methyl-2-butenyl, cycloalkyl, cycloalkenyl, cycloalkyl-lower alkyl or cycloalkenyl-lower alkyl which may be mono- or bicyclic and have preferably 5 to 7 ring-carbon and 1 to 4 chain carbon atoms, such as cyclopropyl, 2,3-dimethyl-cyclopropyl, cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethyl-cyclohexyl, 2,4,6-trimethyl-cyclohexyl, cycloheptyl, cyclooctyl, 2- or 7-norbornanyl, 1- or 2-decahydronaphthyl and the corresponding cycloalkyl-lower alkyl groups in which the chain especially represents methyl, but also ethyl n- or i-propyl, n-, i-, sek. or tert. butyl; it contains in any of the positions available for substitution, for example, one of the specific cycloalkyl groups listed above. A cycloalkenyl or cycloalkenyl-lower alkyl group represents, for example, 1- or 2-cyclopentyl, 2,4-cyclopentadienyl, 2- or 3-methyl-2-cyclopentyl, 4,5-dimethyl-2-cyclopentyl, 1-, 2-or 3-cyclohexenyl, 2,5-cyclohexadienyl, 2-, 3- or 4-methyl-1- or 2-cyclohexenyl, 2,4- or 3,5-dimethyl-1- or 2-cyclohexenyl, 2,4,6-trimethyl-2,5-cyclohexadienyl, 1-, 2- or 3-cycloheptenyl, 2,6-cycloheptadienyl, 2-cyclooctenyl or 2-norborn-5-enyl and the corresponding cycloalkenyl-lower alkyl groups in which the chain has the previously given meaning and contains in any of the positions available for substitution one of the specific cycloalkenyl groups listed above. An araliphatic hydrocarbon radical preferably stands for monocyclic carbocyclic aryl-lower alkyl, but also for monocyclic heterocyclic, especially mono-aza-, oxa-or thiacyclic, aryl-lower alkyl, in which the lower alkyl moiety preferably has the same meaning as given for the cycloalkyl- and cycloalkenyl-lower alkyl groups, such as benzyl, 1- or 2-phenylethyl, 1-, 2- or 3-phenyl-propyl, 2-phenyl-2-propyl, 1-, 2-, 3- or 4-phenyl-butyl, 1- or 2-phenyl-2-butyl and the corresponding heterocyclic aralkyl groups in which phenyl is replaced, for example, by 2-, 3- or 4-pyridyl, 2- or 3-furyl or -thienyl. These radicals may be unsubstituted or substituted, especially in the aromatic portion, by one or more than one of the same or of different substituents, for example, lower alkyl groups, such as those mentioned above, free or functionally converted hydroxy or mercapto groups, such as methoxy, ethoxy, methyl- or ethylmercapto, halogen, e.g. fluoro, chloro or bromo, trifluoromethyl, nitro or amino, especially di-lower alkylamino, e.g. dimethylamino or diethylamino.

Of the radicals shown above, especially $R_2$ may contain said additional substituents, which are present in the aromatic as well as in the aliphatic moieties. Such substituted radicals $R_2$ are, for example, lower haloalkyl, e.g. chloro-, bromo- or iodomethyl, difluoro- or dichloromethyl, trichloromethyl, 1- or 2-chloroethyl, 1,1-, 2,2-, or 1,2-dichloroethyl, 1,1,2- or 1,2,2-trichloroethyl, 1-, 2- or 3-chloropropyl or 2,3-dichloropropyl, lower alkoxy- or alkylmercapto-lower alkyl and their halogenated derivatives, such as methoxy- ethoxy- or n-propoxy-methyl, 2-methoxy- or ethoxy-ethyl, 3-methoxy-propyl, (2,2-dichloroethoxy)-methyl, 2-(2-chloroethoxy)-ethyl, methyl-, ethyl- or i-propylmercapto-methyl, 2-methyl- or ethylmercapto-ethyl, (2,2,2-trifluoroethylmercapto)-methyl or 2-(2,2-dichloroethylmercapto)-ethyl, monocyclic carbocyclic aryl-lower alkoxy or alkylmercapto-lower alkyl, such as benzylmethyl, 2-benzyloxy-ethyl or benzylmercaptomethyl, tertiary amino-lower alkyl, such as di-lower alkylamino- or lower alkyleneimino-lower alkyl, e.g. dimethylaminomethyl, diethylaminomethyl, 2-diethylamino-ethyl, 1-diethylamino-2-methyl-2-propyl, piperidinomethyl or 2-pyrrolidinoethyl.

An acyl radical representing $R_1$, preferably stands for lower alkanoyl, such as acetyl, propionyl, butyryl or pivalyl, but also for lower alkenoyl, such as acryloyl or methacryloyl, monocyclic carbocyclic aroyl or aryl-lower alkanoyl or-alkenoyl, such as benzoyl, phenylacetyl or cinnamoyl. These acyl radicals may be unsubstituted or substituted as shown for the above hydrocarbon radicals.

A lower alkylene group representing $R_2$ and $R_3$ when taken together, preferably forms with the 3-carbon atom a 4 to 7 membered ring; it is exemplified by 1,3-propylene, 1,3- or 1,4-butylene 1,4-, 2,4- or 1,5-pentylene, 3-methyl- or 3-ethyl-1,5-pentylene, 1,5-, 2,5- or 1,6-hexylene.

The substituent $R_7$ preferably stands for chloro or trifluoromethyl.

The compounds of the invention exhibit valuable pharmacological properties. Apart from hypotensive effects they show primarily diuretic activity, as can be demonstrated in animal tests using, for example, rats or dogs as test objects. The new compounds are, therefore, useful as orally applicable diuretics and hypotensives for the relief of edema and the adjunctive management of hypertension. Furthermore, they can be used as intermediates for the preparation of other useful products, particularly of pharmacologically active compounds.

Particularly useful are the compounds of Formula I, in which $R_1$ stands for hydrogen, lower alkyl or lower alkanoyl, $R_3$ and $R_4$ for hydrogen or a direct bond, $R_5$ and $R_6$ for lower alkyl, $R_7$ for chloro or trifluoromethyl and $R_2$ for hydrogen, lower alkyl, lower alkenyl, cycloalkyl, cycoalkenyl, cycloalkyl-alkyl or cycloalkeny-alkyl with 5 to 7 ring-carbon and 1 to 4 chain-carbon atoms, monocyclic carbocyclic arylalkyl with 1 to 4 chain-carbon atoms, lower fluoro- or chloroalkyl, lower alkoxy- or alkylmercapto-lower alkyl, lower fluoro- or chloroalkoxy- or -alkylmercapto-lower alkyl, di-lower alkylamino- or lower alkyleneimino-lower alkyl.

Especially valuable are compounds of the Formula II

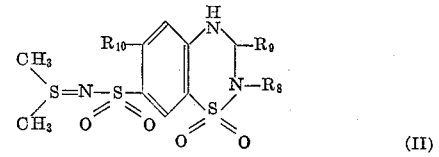

in which $R_8$ stands for alkyl or alkanoyl with 1 to 4 carbon atoms or benzyl, $R_9$ for hydrogen, alkyl with 1 to 4 carbon atoms, cyclopentyl, cyclohexyl, 3-cyclohexenyl, 2-norborn-5-enyl, cyclopentylmethyl, 1- or 2-cyclopentylethyl, benzyl, 1- or 2-phenylethyl, chloromethyl, dichloromethyl, 2-ethylmercapto-ethyl or (2,2,2-trifluoroethylmercapto)-methyl and $R_{10}$ for chloro or tri-fluoromethyl, and in particular the N-(6-chloro-2-ethyl-3,4-dihydro-1,2,4-benzothiadiazine - 7 - sulfonyl) - S,S - dimethyl - sulfilimine-1,1-dioxide wihch, when given orally to rats or dogs at a dosage between about 0.1 and 50 mg./kg./day, shows an outstanding diuretic and natriuretic effect.

The compounds of the invention are prepared by methods in themselves known. Advantageously they are obtained by (a) reacting a compound of the Formula III

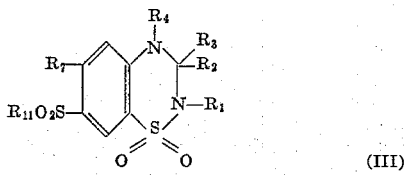

in which $R_{11}$ stands for free or reactively converted amino, with an $R_5$, $R_6$-sulfoxide or (b) reacting a compound of the Formula III, in which $R_{11}$ stands for mono-haloamino, with an $R_5$, $R_6$-mercaptane and, if desired, converting any resulting compound into another disclosed compound.

In the starting material used in reaction (a) $R_{11}$ advantageously stands for amino, but also, for example, for isocyanato or isothiocyanato. In the starting material used in reaction (b) $R_{11}$ preferably stands for chloro- or bromoamino.

The above process is carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

Condensing agents are advantageously used with starting materials in which $R_{11}$ stands for amino or haloamino. In the former instance they are preferably acid anhydrides, such as carboxylic acid anhydrides, e.g. acetic, propionic, butyric, benzoic or phthalic acid anhydride, carbodiimides and the like. In reaction (b) advantageously basic condensing agents are used, such as alkali metal hydroxides or carbonates, e.g. sodium or potassium hydroxide, carbonate, or bicarbonate, tertiary nitrogen bases, such as tri-lower alkylamines or pyridine.

The compounds of the invention so-obtained may be converted into each other according to known methods. For example, compounds containing a 3,4-double bond may be hydrogenated, advantageously with the use of complex light metal hydrides such as sodium borohydride and the like. Resulting compounds unsubstituted in 2- and/or 4-position may be reacted with a reactive ester of the alcohol $R_1$—OH or $R_4$—OH, preferably such of a strong mineral or sulfonic acid, e.g. hydrochloric, hydrobromic, sulfuric or p-toluene sulfonic acid. 2-unsubstituted compounds may also be acylated, for example, with a reactive functional derivative of a corresponding carboxylic acid, such as a halide or anhydride thereof, or resulting 2-acylderivatives may be hydrolyzed, for example, with the use of alkaline hydrolyzing agents.

The compounds of the invention are obtained in the free form or in the form of their salts, depending on the acidic or basic character of the compounds or the conditions under which the process is carried out, the salts are also included in the present invention. Compounds that contain acid groups form metal salts, particularly alkali metal, such as sodium or potassium salts. Compounds which contain, for example, a tertiary amino group, form acid addition salts. These are preferably derived from therapeutically useful inorganic or organic acids, such as hydrohalic acids, e.g. hydrochloric or hydrobromic acid, sulfuric, phosphoric, nitric or perchloric acid, aliphatic, alicyclic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, p-aminobenzoic, anthranilic, p-hydroxybenzoic, salicyclic, p-aminosalicyclic, embonic, methanesulfonic, ethanesulfonic, hydroxyethanesulfonic, ethylenesulfonic, halobenzenesulfonic, toluenesulfonic, naphthalene-sulfonic or sulfanilic acid, methionine, tryptophane, lysine or arginine. The conversion of the free compound into the salts or of the salts into the free compounds or into other salts is achieved according to standard procedures, for example with the use of acidic or alkaline agents or ion exchangers.

The invention further includes any varient of the present process in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly those starting materials should be used in the reactions of the invention that lead to the formation of those compounds indicated above as being especially valuable.

The starting materials are known, or, if they are new, may be prepared by methods in themselves known. The starting material in which $R_{11}$ represents amino is described, for example, in U.S. Patent Nos. 2,809,194; 3,081,301; 3,133,918; 3,163,643; 3,163,644; 3,163,645 and 3,178,424. These compounds may be reacted with phosgene or thiophosgene in order to obtain the compounds in which $R_{11}$ stands for cyanato or thiocyanato or with hypohalous acids or derivatives thereof in order to obtain the compounds in which $R_{11}$ stands for haloamino.

The compounds of the invention may be used in the form of pharmaceutical compositions which are a further object of the present invention. They contain said compounds in admixture with organic or inorganic, solid or liquid pharmaceutical excipients suitable especially for enteral administration. Suitable excipients are substances that do not react with the new compounds, for example water, gelatine, lactose, starch, stearyl alcohol, magnesium stearate, talc, vegetable oils, benzyl alcohol, gums, propylene glycol and other known medicinal excipients. The compositions may be, for example, tablets or pills, or in liquid form as solutions, suspensions or emulsions. They may be sterilized and/or contain adjuvants such as preserving, stabilizing, wetting or emulsifying agents, solution promoters, salts for regulating the osmotic pressure or buffers. They may also contain other therapeutically valuable substances as described in copending application Serial No. 463,396 filed June 11, 1965. These compositions are prepared by conventional methods.

The following examples illustrate the invention, temperatures are given in degrees centigrade and all parts wherever given are parts by weight.

*Example 1*

The suspension of 5.0 g. 6-chloro-7-sulfamyl-2H-1,2,4-benzothiadiazine-1,1-dioxide, 2.64 g. dimethyl sulfoxide and 12.7 ml. acetic acid anhydride is stirred on a steam bath for 30 minutes. Hereupon, it is filtered and the residue washed with hot ethanol to yield the N-(6-chloro-2H - 1,2,4 - benzothiadiazine - 7 - sulfonyl)-S,S-dimethyl-sulfilimine-1,1-dioxide of the formula

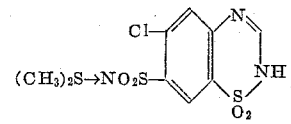

melting at 245–246°.

Example 2

To 3.75 g. N-(6-chloro-2H-1,2,4-benzothiadiazine-7-sulfonyl)-S,S-dimethyl-sulfilimine-1,1-dioxide dissolved in a mixture of 50 ml. water and 7.6 ml. 2 N aqueous sodium hydroxide, 1.0 g. sodium borohydride are added and the mixture is allowed to stand at room temperature for 5 hours. Hereupon its pH is adjusted to 7 with 1 N hydrochloric acid and the precipitate formed is filtered off immediately. The residue is recrystallized from ethanol to yield the N-(6-chloro-3,4-dihydro-1,2,4-benzothiadiazine-7-sulfonyl)-S,S-dimethyl-sulfilimine-1,1dioxide of the formula

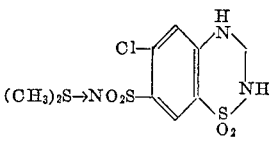

melting at 236–238°.

Example 3

The suspension of 3.0 g. 6-chloro-2-ethyl-7-sulfamyl-3,4 - dihydro - 1,2,4-benzothiadiazine-1,1-dioxide, 1.44 g. dimethyl sulfoxide and 6.91 ml. acetic acid anhydride is stirred on a steam bath for 45 minutes, then poured into 11.5 ml. 24% aqueous sodium hydroxide containing some crushed ice, whereupon an oil separates. The supernatant solution is decanted off and the oil taken up in ethanol-diethyl ether. The organic solution is dried and concentrated yielding upon cooling the crystalline N-(6-chloro - 2-ethyl - 3,4 - dihydro-1,2,4-benzothiadiazine-7-sulfonyl)-S,S-dimethyl-sulfilimine-1,1-dioxide of the formula

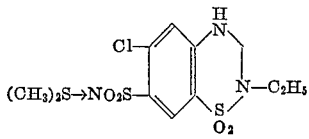

melting at 188–190°.

Example 4

The mixture of 10.0 g. 6-chloro-7-sulfamyl-3,4-dihydro-1,2,4 - benzothiadiazine - 1,1-dioxide, 8.67 g. dimethyl-sulfoxide and 25.3 ml. acetic acid anhydride is kept on a steam bath for 45 minutes and then poured into 42 ml. 24% aqueous sodium hydroxide containing some ice. From the yellow oil formed, the supernatant solution is decanted off, the oil taken up in diethyl ether, the solution dried, concentrated and upon scratching the N-(1-acetyl-6-chloro - 3,4-dihydro-1,2,4-benzothiadiazine-7-sulfonyl)-S,S-dimethyl-sulfilimine-1,1-dioxide of the formula

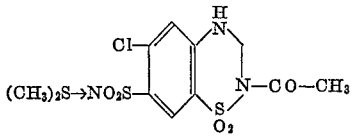

is obtained, which melts after recrystallization from water at 69–73°.

What is claimed is:
1. A member selected from the group consisting of a compound having the formula

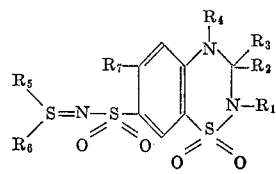

in which $R_1$ stands for a member selected from the group consisting of hydrogen, lower alkyl and lower alkanoyl, $R_2$ for a member selected from the group consisting of hydrogen, lower alkyl, lower alkenyl, cycloalkyl, cycloalkenyl, cycloalkyl-alkyl and cycloalkenyl-alkyl with 5 to 7 ring-carbon and 1 to 4 chain-carbon atoms, phenyl-alkyl with 1 to 4 chain-carbon atoms, lower fluoroalkyl, lower chloroalkyl, lower alkoxy-lower alkyl, lower alkylmercapto-lower alkyl, lower fluoroalkoxy-lower alkyl, lower chloroalkoxy-lower alkyl, lower fluoroalkylmercapto-lower alkyl, lower chloroalkylmercapto-lower alkyl, di-lower alkylamino-lower alkyl and lower alkeneimino-lower alkyl, $R_3$ and $R_4$ for a member selected from the group consisting of hydrogen and a direct bond, $R_5$ and $R_6$ for lower alkyl and $R_7$ for a member selected from the group consisting of chloro and trifluoromethyl, an alkali metal salt and an acid addition salt thereof.

2. A compound as claimed in claim 1 and having the formula

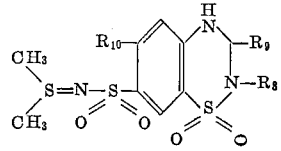

in which $R_8$ stands for a member selected from the group consisting of alkyl and alkanoyl with 1 to 4 carbon atoms and benzyl, $R_9$ for a member selected from the group consisting of hydrogen, alkyl with 1 to 4 carbon atoms, cyclopentyl, cyclohexyl, 3-cyclohexenyl, 2-norborn-5-enyl, cyclopentylmethyl, 1-cyclopentylethyl, 2-cyclopentyl-ethyl, benzyl, 1-phenyl-ethyl, 2-phenyl-ethyl, chloromethyl, dichloromethyl, 2-ethylmercapto-ethyl and (2,2,2-trifluoroethylmercapto)-methyl and $R_{10}$ for a member selected from the group consisting of chloro or trifluoromethyl.

3. A compound as claimed in claim 1 and being the N - (6 - chloro - 2H - 1,2,4 - benzothiadiazine - 7 - sulfonyl) - S,S, - dimethylsulfilimine - 1,1 - dioxide.

4. A compound as claimed in claim 1 and being the N - (6 - chloro - 3,4 - dihydro - 1,2,4 - benzothiadiazine - 7 - sulfonyl) - S,S, - dimethyl - sulfilimine - 1,1 - dioxide.

5. A compound as claimed in claim 1 and being the N - (6 - chloro - 2 - ethyl - 3,4 - dihydro - 1,2,4 - benzothiadiazine - 7 - sulfonyl) - S,S, - dimethyl - sulfilimine-1,1 - dioxide.

6. A compound as claimed in claim 1 and being the N - (1 - acetyl - 6 - chloro - 3,4 - dihydro - 1,2,4 - benzothiadiazine - 7 - sulfonyl) - S,S, - dimethyl - sulfilimine-1,1 - dioxide.

References Cited by the Examiner
UNITED STATES PATENTS 3,163,644  12/1964  de Stevens et al. _____ 260—243
3,163,645  12/1964  de Stevens et al. _____ 260—243

NICHOLAS S. RIZZO, *Primary Examiner.*